Jan. 21, 1941.    C. D. WOLFE    2,229,358
ANIMAL TRAP
Filed April 4, 1940    2 Sheets-Sheet 2
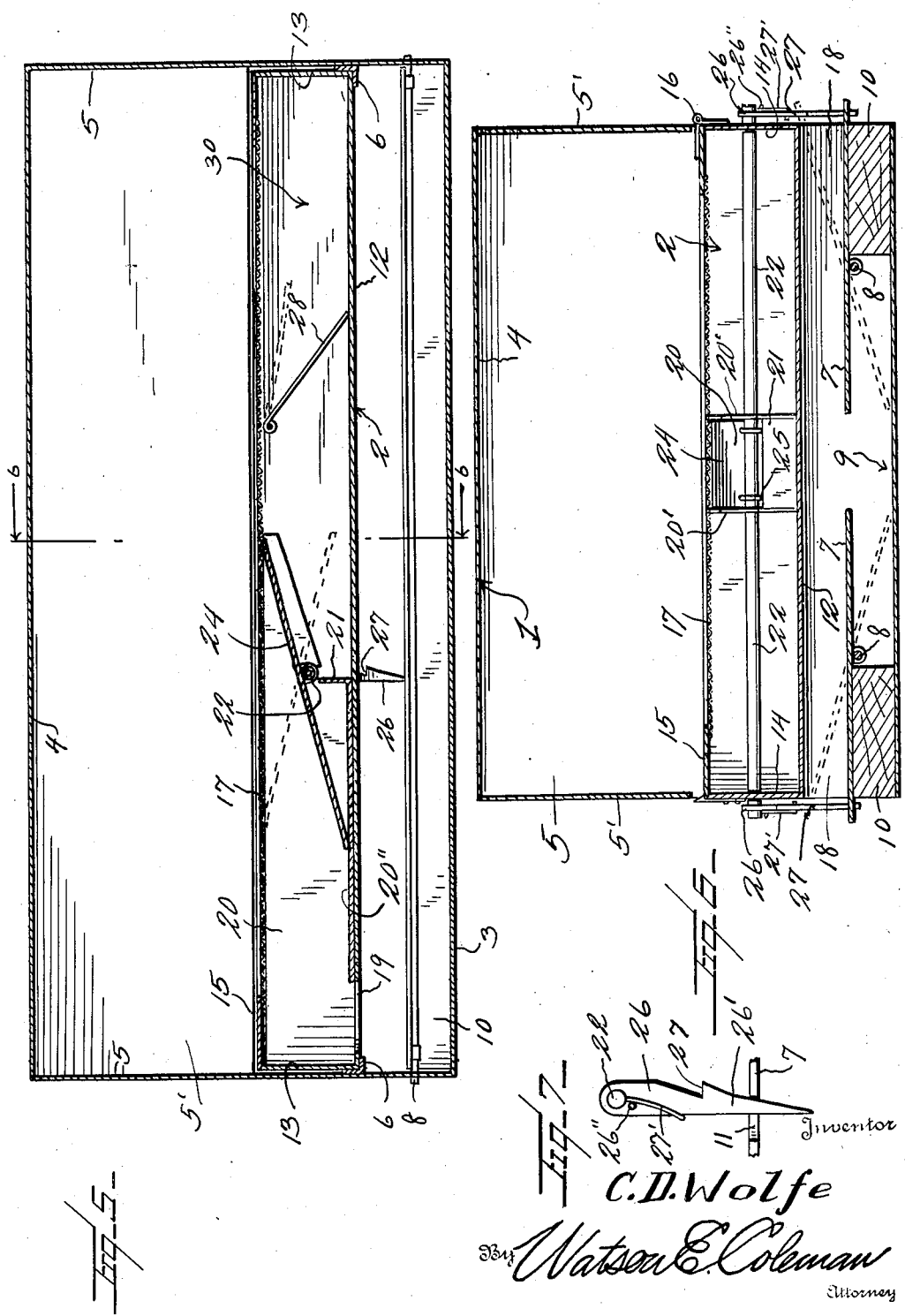

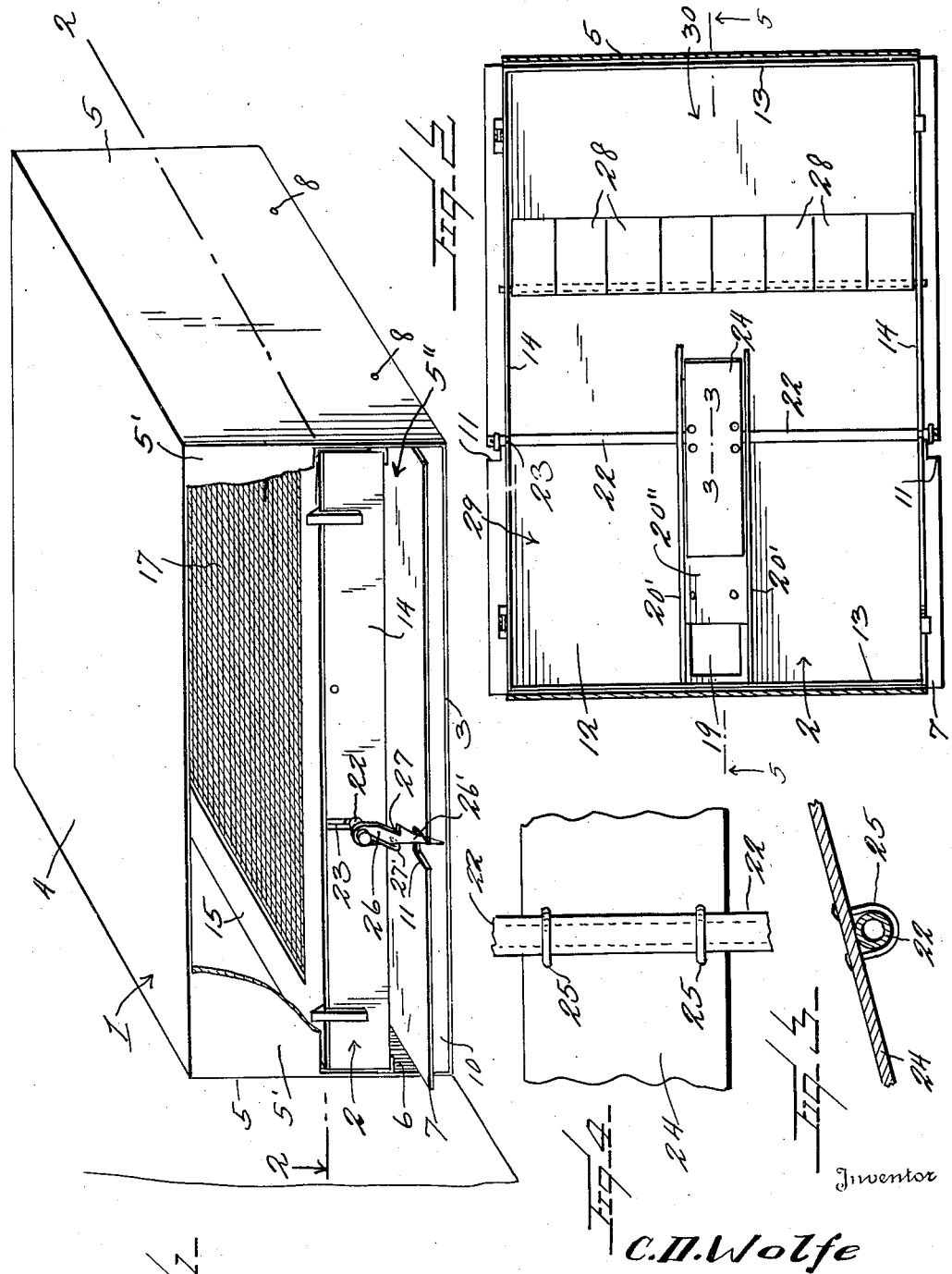

Patented Jan. 21, 1941

2,229,358

UNITED STATES PATENT OFFICE 2,229,358

ANIMAL TRAP

Claud D. Wolfe, Little Rock, Ark.

Application April 4, 1940, Serial No. 327,879

14 Claims. (Cl. 43—76)

This invention relates to the class of trapping and pertains particularly to improvements in animal traps.

The primary object of the present invention is to provide a trap designed primarily for catching mice and rats, which is so designed that, when placed in a pathway along which the animals customarily travel, the animals will be led to pass into the trap in the belief that it forms merely a passageway running in the same direction as the path and will thus enter the trap without hesitation.

Another object of the invention is to provide a novel animal trap which is of the type which is automatically reset by the animal after it passes from one compartment of the trap into another one so that each time an animal is caught the trap will be reset in preparation for the catching of another animal.

Another object of the invention is to provide an improved animal trap which is made up of a series of compartments and in which the animal, when entering one compartment, automatically closes off his path of escape therefrom to the outside of the trap and is compelled to pass from such compartment into a second compartment and in so doing resets the closure means for the first compartment so that another animal may enter.

A still further object of the invention is to provide in a self-resetting trap of the character stated, a novel construction wherein the animals caught and congregated in one chamber or compartment of the trap, may be removed in said compartment for convenient disposal.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Figure 1 is a view in perspective of the trap embodying the present invention, parts being broken away.

Figure 2 is a horizontal section taken on the line 2—2 of Figure 1.

Figure 3 is a sectional view on the line 3—3 of Figure 2.

Figure 4 is a view in bottom plan of the central portion of the inner treadle.

Figure 5 is a longitudinal sectional view on the line 5—5 of Figure 2.

Figure 6 is a transverse section on the line 6—6 of Figure 5.

Figure 7 is a view in elevation of one of the treadle securing latches illustrating the manner in which the latch is controlled.

Referring now more particularly to the drawings, it will be seen that the trap structure embodying the present invention consists of an outer housing, which is indicated generally by the numeral 1, and an inner housing or compartment, which is indicated generally by the numeral 2, and which is insertible into and removable from the housing 1 as a unit.

The housing 1 comprises a bottom wall 3, a top wall 4, end walls 5 and side walls 5' which extend downwardly from the top wall 4 through substantially half the height of the housing, thus leaving front and rear openings 5" for the lower part of the housing. Within the housing there is secured to and transversely of each end wall, a guide or track flange 6 which is spaced above the bottom wall 3 and upon which the compartment 2 is slidably disposed as hereinafter described.

Adjacent each opening 5" of the housing 1 and extending lengthwise of the housing is a relatively wide treadle 7, each treadle being pivotally supported at its ends by trunnions 8 which are disposed upon the longitudinal center of the treadle and which are mounted in the end walls. A relatively wide space is left through the longitudinal center of the housing between the inner edges of the treadles, as indicated at 9.

The outer half of each treadle has disposed therebeneath a board 10 which extends the length of the housing and has a thickness which brings its top surface in close proximity to the underside of the outer half of the overlying treadle when the treadle is in horizontal position and the outer half of each treadle is of slightly greater width than the inner half or is otherwise suitably weighted so that it will normally swing downwardly to maintain the treadle in horizontal position. The outer edge of each treadle 7, adjacent the transverse center, is provided with a notch 11 for the purpose hereinafter stated.

The compartment 2 is in the form of a box having a bottom wall 12, end walls 13, side walls 14 and a top 15 which is hingedly connected, as indicated at 16, to the top edge of one side wall 14 so that the top may be raised to open the compartment. This top 15 has an open central portion which is covered by a screen 17.

The compartment 2, as previously stated, slides into the housing 1 on the tracks 6 and these tracks are disposed at a sufficient height above the horizontal planes of the treadles 7 to provide room for the passage of a mouse or rat into the trap over the treadles and into the area 9. The openings between the underside or bottom wall 12 of the compartment and the treadles are indicated at 18 and constitute opposite entrances to the trap which extend the length of the housing. The area between the compartment 2 and the bottom wall 3 of the housing constitutes a first or main animal receiving chamber.

The bottom wall 12 of the compartment, at one end of the latter, is provided with an entrance opening 19 which leads into a passage or hallway 20 which extends from the end wall 13 adjacent this opening 19 substantially halfway through the length of the compartment. This passageway or hallway is formed preferably from a sheet or piece of metal which is shaped to have the spaced parallel side walls 20' and the integral connecting floor 20'', this floor terminating at one end in the upstanding wall 21 which extends only partway of the height of the passageway, but is set inwardly of the actual outlet end of the passageway or the adjacent ends of the side walls 20' as will be clearly seen upon reference to Fig. 5.

Disposed above the edge of the transverse wall 21 of the passageway is a rock shaft 22 which extends entirely across the compartment from one side wall 14 to the other. The ends of this shaft extend through openings 23 in the side walls 14 of the compartment, as shown in Fig. 1.

Within the passageway 20 is a treadle 24 which extends across and rests upon the shaft 22 and is balanced so that the end nearest the outlet end of the passageway will normally maintain a raised position to close the outlet end of such passage, as shown in Fig. 5, and the other or inner end of the treadle will rest upon the floor 20''. The wall 21 extending transversely of the passage beneath the shaft 22 and the treadle closes the passage against the entrance of an animal from within the compartment into which the passage opens.

The treadle is secured in any suitable manner to the shaft 22 as by the use of the U-bolts 25, so that upon oscillation of the treadle, the shaft will be rocked.

Each outer end of the rock shaft 22 carries the depending hooked latch arm 26 which is provided with a relatively long nose or point 26' and inwardly of this point with a notch 27. The nose of each latch hook extends into the notch 11 of the adjacent treadle 7 and the nose of the hook is normally urged in one direction in the treadle notch by a light spring 27' which is attached to the adjacent end of the shaft 22 and which bears against an edge of the hook, as shown in Fig. 7. Each hook is mounted upon the shaft to swing freely and thus when one treadle 7 is raised at its outer side and held in raised position by the adjacent hook 26, oscillation of the other treadle may occur to cause movement of the hook adjacent thereto without turning the shaft 22 and releasing the first treadle. However, the treadle securing hooks are oscillated to release the treadles 7 when the passage treadle 24 is oscillated, by the following means. Each hook 26 is provided with a pin 26'' which extends across the adjacent spring 27' and lies upon that side of the spring toward which such spring would be shifted or moved when the shaft 22 is turned by the depression of the raised end of the treadle 24, so that upon such turning of the shaft 22, which would be in a clockwise direction, each of the springs 27' will be brought to bear against the adjacent pins 26'' and will swing the hooks in a direction to release the adjacent treadles 7.

Within the compartment 2 there is provided between the side walls 14 and across and in spaced relation with the outlet end of passage 20, a series of hanging doors 28, the lower ends of which rest upon the floor 12, the doors being directed from their pivotally supported upper ends, away from the outlet end of the passage. By providing this series of doors, compartment 2 is divided into the chambers 29 and 30, which may be referred to respectively, as the intermediate and end chambers, since the chamber 29 is intermediate between the chamber 30 and the entrance chamber in which the entrance closing treadles 20 are located.

From the foregoing, it will be readily apparent that when the trap is set, the treadles 7 will be in their normal horizontal positions so that the entrance openings 18 at the opposite sides of the trap will be clear and thus when the trap is set in a position where it is known that mice or rats run, the animals will not be deterred from entering the openings because of the apparent fact that the passage from one side of the trap to the other is clear and that they may run straight through. However, when the animal enters either of the openings 18 and crosses the treadle 7 to the inner side, the treadle will immediately swing down upon its inner side and the outer edge will be caught and secured by the engagement of an edge of the notch 11 with the notch 27 of the swinging arm 26. The animal will then try to cross over the opposite treadle so as to leave the trap through the opposite opening but this procedure will bring about the oscillation of the other treadle when the animal steps upon its inner edge and the latching of the second treadle in entrance closing position. The animal will thus be trapped in the first chamber between the treadles and its only apparent means of escape will be through the opening 19 in the floor of compartment 2. Seeking this means of escape the animal will be led along the passageway 20 across the inner treadle 24 into the intermediate chamber 29 and in passing over the treadle 24 he will oscillate the rock shaft 22 so as to swing the depending hooks 26 into a position where the entrance treadles will be released and will be permitted to drop back to their set positions. The inner treadle will swing back to its normal position in which it closes the outlet end of the passage 20, thus trapping the animal in the chamber 29. In seeking an escape from the intermediate chamber, the animal, not being able to return through the passage 20 because of the fact that the treadle 24 has swung into passage closing position, will pass into the end chamber 30 under the swinging doors 28.

After an animal or a number of animals have been trapped in the end chamber 30 they may be disposed of by taking out the compartment 2 from the housing and immersing the end of the compartment in a receptacle of water until the animals are drowned.

What is claimed, is:

1. An animal trap comprising a structure having an entrance chamber provided with an entrance opening, a treadle disposed adjacent the entrance opening and across which an animal passes from the opening into the entrance chamber, said treadle having a depressed position into which it is moved by an animal passing thereover, in which it closes the entrance opening, means for securing the treadle when oscillated to said depressed position, means providing a passageway from the entrance chamber to the second chamber, and means disposed in said passageway and over which the animal passes, which is operatively coupled with said treadle securing means for effecting the release of said treadle for its return to set position.

2. An animal trap comprising a structure formed to provide an entrance chamber and a second chamber, means forming an entrance opening for said entrance chamber, a pivotally mounted treadle disposed adjacent said entrance opening and overbalanced on the side adjacent the entrance opening for normally maintaining a horizontal position parallel with the bottom of the entrance chamber, said treadle being freely oscillatable upon application of weight to its inner portion to a depressed position in which the outer edge is raised to the top part of the entrance opening whereby the treadle closes the entrance opening, a latching means engaging and holding said treadle when the same is moved to its depressed position, means providing a passageway from the entrance chamber to the second chamber, and a shiftable treadle in said passageway which is moved by passage of an animal thereover into the second chamber, having an operative connection with said latching means for releasing the same from the first treadle for the return of the latter to its normal position.

3. An animal trap comprising a structure formed to provide a lower chamber and an overlying upper chamber, said lower chamber having opposite sides provided with entrance openings, a treadle pivotally supported and normally horizontally disposed within the first chamber and inwardly of each entrance opening and substantially in the plane of the lower edge of the opening, said treadles each being oscillatable to a depressed position where its outer edge rises to the top of the adjacent opening and the treadle closes the opening, a swinging latch adjacent the outer edge of each treadle and adapted to engage such edge and hold the treadle when the treadle is moved to its depressed position, means forming a passageway from the first chamber into the overlying second chamber, a treadle in said passageway normally closing the same and adapted to be oscillated by an animal passing into the second chamber, and means connected with and actuated by said last treadle for releasing said latches when the last named treadle is oscillated in one direction to restore the first treadles to their normal position.

4. An animal trap comprising a structure formed to provide a lower chamber and an overlying upper chamber, said lower chamber having opposite sides provided with entrance openings, a treadle pivotally supported and normally horizontally disposed within the first chamber and inwardly of each entrance opening and substantially in the plane of the lower edge of the opening, said treadles each being oscillatable to a depressed position where its outer edge rises to the top of the adjacent opening and the treadle closes the opening, a swinging latch adjacent the outer edge of each treadle and adapted to engage such edge and hold the treadle when the treadle is moved to its depressed position, means forming a passageway from the first chamber into the overlying second chamber, a treadle in said passageway normally closing the same and adapted to be oscillated by an animal passing into the second chamber, means connected with and actuated by said last treadle for releasing said latches when the last named treadle is oscillated in one direction to restore the first treadles to their normal positions, means forming a third trapping chamber, and a plurality of freely moving one-way doors separating the second and third chambers and leading only into the third chamber.

5. An animal trap comprising a structure formed to provide a lower chamber and an overlying upper chamber, said lower chamber having opposite sides provided with entrance openings, a treadle pivotally supported and normally horizontally disposed within the first chamber and inwardly of each entrance opening and substantially in the plane of the lower edge of the opening, said treadles each being oscillatable to a depressed position where its outer edge rises to the top of the adjacent opening and the treadle closes the opening, a swinging latch adjacent the outer edge of each treadle and adapted to engage such edge and hold the treadle when the treadle is moved to its depressed position, means forming a passageway from the first chamber into the overlying second chamber, a treadle in said passageway normally closing the same and adapted to be oscillated by an animal passing into the second chamber, means connected with and actuated by said last treadle for releasing said latches when the last named treadle is oscillated in one direction to restore the first treadles to their normal positions, means forming a third trapping chamber, and a plurality of freely moving one-way doors separating the second and third chambers and leading only into the third chamber, the said second and third chambers constituting a structural unit separable from the first chamber and having a removable cover by which access may be had to the second and third chambers.

6. An animal trap comprising a structure formed to provide an entrance chamber and a second chamber, means providing an entrance opening to the entrance chamber, a pivotally supported treadle disposed within the entrance chamber in front of said opening and normally horizontally disposed in substantially the same plane as the lower part of the opening, said treadle being oscillatable to a depressed position in which the outer edge is disposed adjacent the top of the entrance opening and the treadle closes such opening, means providing an entrance from the entrance chamber to the second chamber, a rock shaft extending across the second chamber, a treadle supported upon said rock shaft and normally closing said second entrance and adapted to be oscillated in one direction to permit an animal to pass from the entrance chamber to the second chamber, and latching means operatively coupled with said shaft for engaging and holding the first treadle in its depressed position, said latching means being actuated upon the actuation of the second treadle in the said one direction for the release of the first treadle.

7. An animal trap comprising a housing having an open side, a compartment insertible into said housing through said open side and supported above the bottom of the housing, the area beneath said compartment at said open side providing an entrance opening into the housing into the area beneath the compartment, a normally horizontally disposed treadle pivotally supported within the housing adjacent the entrance opening and substantially in the plane of the bottom of such opening, said treadle being oscillatable to a depressed position in which the outer edge rises to the overlying bottom of the compartment to close the entrance opening, shiftable latch means engaging the treadle when oscillated to its depressed position to secure the treadle in such position, means providing a passage from the area beneath the compartment into the compartment, a shiftable guard means for said passage which is movable in one direction by an animal passing therethrough into the compartment, and an operative coupling between said shiftable guard means and said latching means whereby actuation of the shiftable guard means in the said one direction effects the release of the treadle by said latching means.

8. An animal trap comprising a housing having an open side, a compartment insertible into said housing through said open side and supported above the bottom the housing, the area beneath said compartment at said open side providing an entrance opening into the housing into the area beneath the compartment, a normally horizontally disposed treadle pivotally supported within the housing adjacent the entrance opening and substantially in the plane of the bottom of such opening, said treadle being oscillatable to a depressed position in which the outer edge rises to the overlying bottom of the compartment to close the entrance opening, shiftable latch means engaging the treadle when oscillated to its depressed position to secure the treadle in such position, means providing a passage from the area beneath the compartment into the compartment, a shiftable guard means for said passage which is movable in one direction by an animal passing therethrough into the compartment, and an operative coupling between said shiftable guard means and said latching means whereby actuation of the shiftable guard means in the said one direction effects the release of the treadle by said latching means, said compartment being divided into two chambers into one of which said passage leads, by a plurality of freely swinging doors movable in one direction only to permit passage of an animal from the chamber into which the said passage leads into the other chamber.

9. An animal trap comprising a housing having an open side, a compartment insertible into said housing through said open side and supported above the bottom of the housing, the area beneath said compartment at said open side providing an entrance opening into the housing into the area beneath the compartment, a normally horizontally disposed treadle pivotally supported within the housing adjacent the entrance opening and substantially in the plane of the bottom of such opening, said treadle being oscillatable to a depressed position in which the outer edge rises to the overlying bottom of the compartment to close the entrance opening, shiftable latch means engaging the treadle when oscillated to its depressed position to secure the treadle in such position, means providing a passage from the area beneath the compartment into the compartment, a shiftable guard means for said passage which is movable in one direction by an animal passing therethrough into the compartment, and an operative coupling between said shiftable guard means and said latching means whereby actuation of the shiftable guard means in the said one direction effects the release of the treadle by said latching means, said compartment having a removable top cover.

10. An animal trap comprising a housing having top, bottom and end walls and having opposite sides open, means upon the inner sides of said end walls providing supporting guides, a compartment insertible into said housing and adapted to be supported upon said guides, said compartment having top, bottom, side and end walls, the compartment being supported by the guides above the housing bottom wall to provide entrance openings, the area between the bottom of the compartment and the bottom wall of the housing constituting a chamber, a pivotally supported treadle normally horizontally disposed within said chamber substantially in the plane of the bottom of and adjacent each opening, each of said treadles being oscillatable to a depressed position in which its outer edge rises to the bottom of said compartment to close the adjacent opening, said compartment having its bottom wall provided with an opening, means within said compartment leading from the bottom wall opening providing a passageway having an outlet end remote from the bottom wall opening, an oscillatable treadle in the passageway adjacent the outlet end and extending from the bottom to the top of the passageway to close said end, a rock shaft extending transversely of the compartment and supporting said treadle and projecting at its ends beyond the side walls of the compartment, latch members carried upon the ends of said rock shaft, means facilitating the engagement by said latch members of the outer edges of said first treadles when the latter are rocked to their depressed positions, said latch members being rockable upon oscillation in one direction of said treadle in said passageway to release the first mentioned treadles.

11. An animal trap comprising a housing having top, bottom and end walls and having opposite sides open, means upon the inner sides of said end walls providing supporting guides, a compartment insertible into said housing and adapted to be supported upon said guides, said compartment having top, bottom, side and end walls, the compartment being supported by the guides above the housing bottom wall to provide entrance openings, the area between the bottom of the compartment and the bottom wall of the housing constituting a chamber, a pivotally supported treadle normally horizontally disposed within said chamber substantially in the plane of the bottom of and adjacent each opening, each of said treadles being oscillatable to a depressed position in which its outer edge rises to the bottom of said compartment to close the adjacent opening, said compartment having its bottom wall provided with an opening, means within said compartment leading from the bottom wall opening providing a passageway having an outlet end remote from the bottom wall opening, an oscillatable treadle in the passageway adjacent the outlet end and extending from the bottom to the top of the passageway to close said end, a rock shaft extending transversely of the compartment and supporting said treadle and projecting at its ends beyond the side walls of the compartment, latch members carried upon the ends of said rock shaft, means facilitating the engagement by said latch members of the outer edges of said first treadles when the latter are rocked to their depressed positions, said latch members being rockable upon oscillation in one direction of said treadle in said passageway to release the first mentioned treadles, and a wall dividing said compartment into two chambers, into one of which chambers said passageway opens, said wall being made up of a plurality of freely movable one-way doors opening into the other one of the chambers.

12. An animal trap, comprising a structure having an entrance chamber provided with an entrance opening, a second chamber, a passage connecting the chambers, a treadle disposed within the entrance chamber adjacent the entrance opening across which an animal passes in entering the entrance chamber, the treadle having a depressed position into which it is moved by an animal passing thereover, in which position it closes the entrance opening, an oscillatably supported latch constructed and arranged to engage the treadle when depressed to maintain it in depressed position, a treadle within said passage over which the animal must pass from the entrance chamber to the second chamber, said second treadle normally closing the passage against the return of an animal from the second chamber into the entrance chamber, and an operative coupling between the second treadle and the latch which releases the latch engagement with the first treadle upon the oscillation of the second treadle from its normal position whereby the first treadle may return to a set position.

13. An animal trap, comprising a structure having an entrance chamber provided with an entrance opening, a second chamber, a treadle disposed adjacent the entrance opening and across which an animal passes from the opening into the entrance chamber, the treadle having a depressed position into which it is moved by an animal passing thereover, in which it closes the entrance opening, means providing a communicating passageway between the chambers, a shaft extending across said communicating passageway and oscillatably supported, a latch member carried by the shaft and arranged to engage said treadle upon its oscillation to the depressed position to maintain said treadle in position to close the entrance opening, and a treadle within said passageway and secured to and supported upon said shaft, the second-mentioned treadle having a normal position in which it closes the passageway against the return of an animal from the second chamber to the first chamber, the oscillation of the second treadle moving said shaft and latch to release the first treadle.

14. An animal trap, comprising a structure having an entrance chamber provided with an entrance opening, a second chamber disposed above the entrance chamber, means forming a passageway having an end opening downwardly into the entrance chamber and a second end opening into the second chamber, a treadle disposed adjacent the entrance opening and across which an animal passes from the opening into the entrance chamber, the treadle having a depressed position in which it closes the entrance opening, a shaft extending across said passageway and oscillatably supported, a latch finger carried by the shaft and arranged to engage and hold said treadle when it is oscillated to the said depressed position, a second treadle supported in the passage upon said shaft to oscillate with the shaft and having a normal position in which it closes the passage against the return of an animal from the second chamber to the entrance chamber, said latch having limited free oscillation upon the shaft, and a spring member connected with the shaft and operatively engaging the latch to normally urge the latter into a position of engagement with the first treadle when the same is depressed.

CLAUD D. WOLFE.